Re. 24471
Feb. 23, 1954
G. HERZOG
2,670,442
RADIOACTIVITY BOREHOLE LOGGING APPARATUS
Filed April 25, 1950
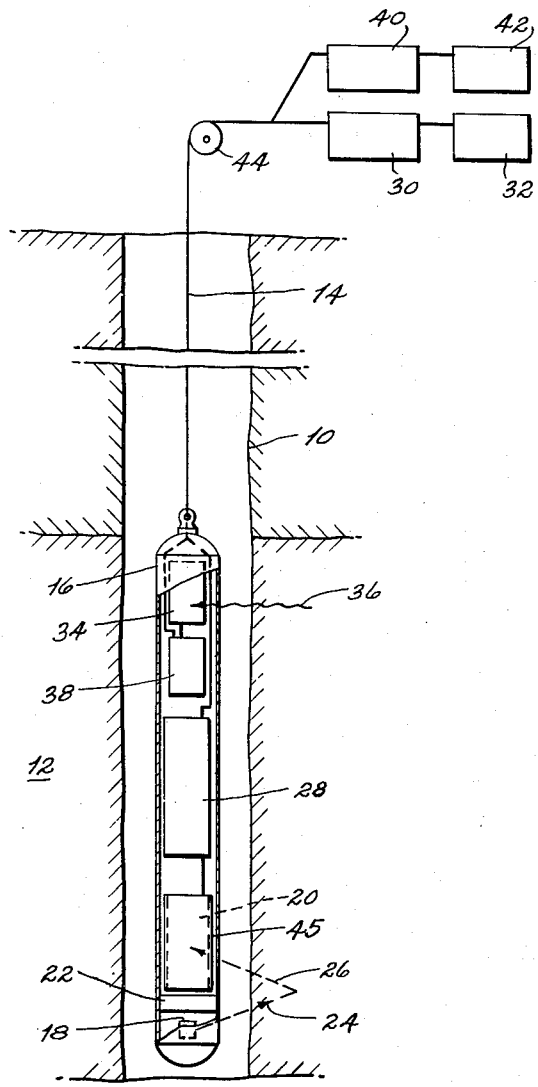
INVENTOR.
GERHARD HERZOG
BY
ATTORNEYS Patented Feb. 23, 1954

2,670,442

UNITED STATES PATENT OFFICE 2,670,442

RADIOACTIVITY BOREHOLE LOGGING APPARATUS

Gerhard Herzog, Houston, Tex., assignor to The Texas Company, New York, N. Y., a corporation of Delaware Application April 25, 1950, Serial No. 157,903

5 Claims. (Cl. 250—83.6)

This invention relates to the logging of bore holes, more particularly to an apparatus or logging instrument by means of which two different types of logs may be made simultaneously, one of these being a log of the natural gamma radioactivity of the formations surrounding the bore hole and the other being a log of gamma rays induced in the formations by bombarding them with neutrons from a source disposed in the logging instrument.

The principal object of the invention is the provision of a logging instrument of this type which will enable one to obtain clear and accurate logs of the types mentioned above without the interference usually caused by gamma rays which are also emitted from the neutron source and which are scattered within the formations or within the fluid usually present in the bore hole and which may strike the radiation detectors disposed within the instrument.

In natural gamma ray logging, as is generally well known, a gamma ray detector and associated electronic equipment is passed through the bore hole and gamma rays naturally emitted from the formations traversed by the hole strike the detector, the response or output of the detector being transmitted to the surface over a conductor cable where it is amplified and recorded.

In a neutron-gamma ray log a source of neutrons and a gamma ray detector are passed through the bore hole and neutrons from the source pass outwardly into the formations where they cause gamma rays to be induced or liberated due to nuclear collision between the neutrons and the atoms in the formation. Some of these induced gamma rays strike the detector and the detector output is transmitted to the surface where it is amplified and recorded. In the natural gamma ray log information is obtained as to the nature of the different formations, for example, whether they constitute shales, limestone and the like, whereas in the neutron-gamma ray log information can be obtained as to the hydrogen content and thus the porosity of the formations.

In another type of log which also provides information as to the porosities of the formations, called a neutron-neutron log, neutrons from a source penetrate the formations where they are scattered or diffused, some of them returning to the hole where they intercept a neutron detector the output of which is transmitted to the surface and recorded.

Usually the logs mentioned above are made separately, that is by running the proper instruments through the hole at different times. If two logs such as a natural gamma ray log and a neutron-gamma ray log are obtained on separate runs and the logs then compared there is always the question of proper depth alignment. The logging instruments are quite heavy and when suspended several thousand feet on the bottom of a wire cable some considerable stretching of the cable occurs and this may vary with the different runs. It is, therefore, difficult to tell whether a certain indication on, say, the natural gamma ray log occurred at exactly the same depth at which a certain indication occurred on the neutron-gamma log. Furthermore, radioactivity bore hole logging is usually done at a speed of approximately 1,000 feet per hour and it can be seen that if two types of logs are run separately the time consumed is at least twice that required to make either of the logs singly and this is a very important item as the well must, of course, be shut down, i. e., all drilling operations must be held up while the logs are being made.

In accordance with the invention a logging tool or instrument is provided which will produce simultaneously, in one logging trip through the hole, both a natural gamma ray log and a neutron-gamma ray log or a neutron-neutron log with the advantage that the two records are in exact alignment with respect to depth. Furthermore with the arrangement of the source and detectors which will be described, the bothersome gamma rays which originate in the source produce no detrimental effect and in particular they do not strike the natural gamma ray detector to cause spurious indications which might be assumed to be due to the natural gamma rays of the formations.

For a better understanding of the invention reference may be had to the accompanying drawing in which the single figure is a vertical sectional elevation through a bore hole in which a well logging instrument embodying the invention is suspended from the surface by means of a conductor cable.

Referring to the drawing a bore hole 10 is shown as traversing several subsurface formations such as that indicated at 12 which in this instance will be considered as a producing formation such as an oil sand. Suspended within the hole by means of a conductor cable 14 is a logging instrument 16 comprising a sealed, elongated housing in which the various instruments are mounted. The housing is preferably at least eight feet in length for reasons to be discussed. Within the instrument housing close to the bottom thereof is a source of neutrons 18, which as is quite common, may comprise a mixture of radium and beryllium which in addition to the neutrons also emits gamma rays due to the radium present. Also positioned within the housing, above but fairly close to the source, is a gamma ray detector 20 which may comprise a counter of the pulse producing type, preferably one such as is disclosed in the U. S. Letters Patent of D. G. C. Hare, No. 2,397,071, granted March 19, 1946. Between the source 18 and detector 20 is a layer of material 22 capable of absorbing those gamma rays originating in the source and which otherwise would pass directly to the detector. Neutrons from the source 18 penetrate the formations as is indicated by the dotted line 24 and due to nuclear collision may liberate gamma rays such as that indicated by the dotted line 26, and some of these gamma rays may travel in a direction such that they intercept the detector 20 whereby due to the ionization of the gas within the detector electrical discharges or pulses are produced. The output of the detector 20 is conducted to a suitable amplifying circuit indicated diagrammatically at 28 the output of which is connected to the lower end of the cable 14. At the surface the detector output is amplified as at 30 and then recorded as at 32 usually on a moving tape or strip.

Disposed within and at the upper end of the instrument 16 is another gamma ray detector 34 which also may be of the counter or pulse producing type as is disclosed in the aforementioned Hare patent. Gamma rays such as that indicated at 36 emitted from the formations strike the detector 34 and the output of the detector is amplified at 38 and also impressed upon the lower end of the cable 14. At the surface the cable is shown as also being connected to an amplifier 40 and a recorder 42 by means of which a record is made of the intensity of the gamma rays naturally emitted from the formations. The cable passes over a suitable measuring instrument 44 which indicates or records the depth of the instrument 16 in the hole at all times so that the logs can be properly correlated with depth.

When the source 18 emits both neutrons and gamma rays the distance between the source and the natural gamma ray detector 34 should be sufficiently large so that the natural gamma ray log is not affected by the gamma rays from the source. As has been mentioned hereinbefore these gamma rays from the source have two ways of reaching the detector 34; first, they could pass directly from the source to the detector but this path is usually effectively blocked by the insertion of sufficient gamma ray absorption material such as the lead or tungsten layer 22. Secondly, the gamma rays from the source may be scattered in the formation or in the drilling mud or other fluid usually present in the bore hole and may strike the natural gamma ray detector. This is prevented in accordance with the present invention by providing sufficient distance between the source and the detector. If the bore hole is filled with a liquid it has been found that a distance of about six feet is sufficient to protect the natural gamma ray detector from the effect of the scattered gamma rays. It seldom happens that a bore hole does not contain liquid but if a "dry" hole were to be logged it would be necessary to space the detector 34 at a considerably farther distance from the source 18 since there would be no liquid present to absorb the scattered gamma rays and the distance would have to be great enough to reduce the scattered gamma ray intensity at the detector 34 due to the inverse square law.

Since the induced or liberated gamma rays have an energy of approximately 1 m. e. v. or higher while the scattered gamma rays have an energy of only about ½ m. e. v. it is preferred to shield the induced gamma ray detector 20 by placing around it a layer of an absorptive material such as about ¼ inch of lead, as indicated at 45. The scattered gamma rays from the source are thus absorbed in this material while the induced gamma rays are able to penetrate the layer and strike the detector. Since the detector 20 is used for the purpose of intercepting the induced gamma rays it must be in relatively close proximity to the neutron source. Thus it cannot be separated from the source as can the natural gamma ray detector 24.

If it is desired to make a neutron-neutron log instead of the neutron-gamma ray log simultaneously with the natural gamma ray log, the detector 20 will comprise a neutron detector, such for example as a proportional counter containing a gas such as methane and in which the cathode may be coated with a suitable alpha particle-emitting substance such as boron. Such a detector can either be shielded to absorb the scattered gamma rays or the circuit 28 can include a suitable discriminator for selecting and transmitting to the surface only the pulses of high amplitude which would generally be those produced by the intercepted neutrons. Such an arrangement is disclosed in the U. S. Letters Patent No. 2,483,139, granted to Gerhard Herzog September 27, 1949.

Since the bottom of a bore hole or well is usually within a producing formation such as that indicated at 12 it is advisable that the log which determines the porosity of the formation, i. e., the neutron gamma or neutron-neutron log can be run all the way to the bottom of the hole. In this case the natural gamma ray log can only be run to a distance from the bottom which is equal to the spacing of the detector 34 from the lower end of the logging instrument. In some instances it may be more desirable to run the natural gamma ray log all the way to the bottom of the hole and in this case the natural gamma ray detector will be mounted within the bottom portion of the instrument 16 while the source 18 will be in the upper end of the instrument with the neutron detector or the induced gamma ray detector, as the case may be, mounted just below the source.

When running the logging instrument into the hole the speed may be anywhere from 1,000 to 10,000 feet per hour but even at the slower speed the surrounding formations would not be bombarded by the neutrons from the source 18 sufficiently long for any substantial amount of delayed secondary radiation to be produced from any material having an appreciable half life, and detected by the natural gamma ray detector 34. It may be added that it is better to make the log while the instrument is passing upwardly through the hole rather than downwardly. If the log were made in a downward direction the logging instrument may be temporarily hung up or caught by the walls of the formations and then dropped suddenly when it is released. Such a log would not, of course, be made at a uniform speed and the indications of the log would not correspond with the depth indications from the cable measuring device 44. When, however, the logging is done in an upward direction the instrument has to pass upwardly at a uniform speed while the cable is being reeled up and an accurate log is thus obtained.

It is understood that due to the distance between the two detectors, one log will be displaced with respect to the other. In comparing the two logs, one may be moved longitudinally to the other until the indications on the logs occurring at the same depths correspond.

Obviously, many other modifications and variations of the invention as hereinbefore set forth may be made without departing from the spirit and scope thereof, and therefore, only such limitations should be imposed as are indicated in the appended claims.

I claim:

1. A device for logging a bore hole comprising an elongated instrument housing adapted to be passed through the bore hole while suspended on a conductor cable, a source of neutrons and gamma rays disposed in a fixed position near the bottom of said housing, a detector for secondary radiation produced by neutron bombardment of the surrounding formations mounted above and in close proximity to said source, a layer of gamma ray absorbing material between said source and said detector, a natural gamma ray detector disposed in a fixed position in the upper end of said housing and separated from said source sufficiently far to be out of reach of gamma rays from the source scattered in the material around said housing, means within the housing for amplifying the outputs of the two detectors and transmitting said outputs upwardly over said cable, and means at the surface for recording the outputs of said two detectors in correlation to the depth of the instrument in the bore hole.

2. A radioactivity bore hole logging assembly comprising an elongated instrument housing adapted to be passed through the bore hole suspended from a conductor cable. a source of neutrons and gamma rays disposed in a fixed position in the bottom of said housing, an induced gamma ray detector mounted above and in close proximity to said source, a layer of gamma ray shielding material between said source and said detector, a natural gamma ray detector disposed in a fixed position in the upper end of said housing and separated from said source by a distance such that scattered gamma rays from the source will be absorbed in material surrounding said housing before reaching the natural gamma ray detector, means within the housing for amplifying the outputs of the two detectors and transmitting said outputs upwardly over said cable, and means at the surface for recording the outputs of said two detectors in correlation to the depth of the instrument in the bore hole.

3. A radioactivity bore hole logging assembly comprising an elongated instrument housing adapted to be passed through the bore hole suspended from a conductor cable, a source of neutrons and gamma rays rigidly mounted in the bottom of said housing, a neutron detector mounted above and in close proximity to said source, a layer of gamma ray shielding material between said source and said detector, a natural gamma ray detector rigidly mounted in the upper end of said housing and separated from said source by at least six feet, means within the housing for amplifying the outputs of the two detectors and transmitting said outputs upwardly over said cable, and means at the surface for recording the outputs of said two detectors to obtain, in correlation to the depth of the instrument in the bore hole, two separate logs, one a log of the gamma rays naturally emitted from the formations traversed by the hole and the other a log of neutrons scattered in said formations and returned to the hole.

4. The method of determining characteristics of sub-surface formations traversed by a bore hole which comprises bombarding said formations by neutrons from a source passed through the hole, measuring in said hole in a zone in the vicinity of said source the intensity of gamma rays induced in said formations due to said neutron bombardment, and simultaneously measuring in a zone in said hole at a constant fixed distance from said first-mentioned zone the intensity of gamma rays naturally emitted by said formations, said distance being sufficiently great that the measurement of naturally emitted gamma rays will not be affected by said neutron-induced gamma rays.

5. The method of determining characteristics of sub-surface formations traversed by a bore hole which comprises bombarding said formations by neutrons from a source passed through the hole, measuring in said hole in a zone at a fixed distance from said source the intensity of gamma rays induced in said formations due to said neutron bombardment, and simultaneously measuring in a zone in said hole at a constant fixed distance from said first-mentioned zone the intensity of gamma rays naturally emitted by said formations, said distance being such that the said zone of measurement of naturally emitted gamma rays will be out of range of the said gamma rays induced by the neutron bombardment.

GERHARD HERZOG.

References Cited in the file of this patent

UNITED STATES PATENTS

| Number | Name | Date |
|---|---|---|
| 2,436,008 | Krasnow et al. | Feb. 17, 1948 |
| 2,504,888 | Siegert et al. | Apr. 18, 1950 |
| 2,508,772 | Pontecorvo | May 23, 1950 |